United States Patent [19]
Johnson

[11] Patent Number: 4,597,695
[45] Date of Patent: Jul. 1, 1986

[54] FACE MILLING APPARATUS WITH EIGHT-EDGED INSERT

[75] Inventor: William B. Johnson, Rockford, Ill.

[73] Assignee: Ingersoll Cutting Tool Company, Rockford, Ill.

[21] Appl. No.: 710,053

[22] Filed: Mar. 11, 1985

[51] Int. Cl.⁴ .............................................. B23C 5/20
[52] U.S. Cl. .................................... 407/113; 407/34; 407/42; 407/114
[58] Field of Search ............... 407/113, 114, 115, 116, 407/34, 40, 42, 47, 48

[56] References Cited

U.S. PATENT DOCUMENTS

| | | |
|---|---|---|
| 2,186,417 | 1/1940 | Kraus . |
| 3,142,110 | 7/1964 | Hertel . |
| 3,416,209 | 12/1968 | Contrucci et al. . |
| 3,662,444 | 5/1972 | Erkfritz . |
| 3,818,562 | 6/1974 | Lacey . |
| 4,294,566 | 10/1981 | Boone . |

FOREIGN PATENT DOCUMENTS

| | | | |
|---|---|---|---|
| 74209 | 3/1983 | European Pat. Off. ............ | 407/114 |
| 0104517 | 4/1984 | European Pat. Off. . | |
| 2016193 | 10/1978 | Fed. Rep. of Germany . | |
| 1135944 | 12/1968 | United Kingdom ................ | 407/113 |

OTHER PUBLICATIONS

*Metal Cutting Principles*, Second edition, Published 1982, by Ingersoll Cutting Tool Company, p. 23.
*Ingersoll-Hertel Single Point Tooling Catalog*, Published 1982, by Ingersoll Cutting Tool Company, pp. 1 and 35.

*Primary Examiner*—Francis S. Husar
*Assistant Examiner*—Jerry Kearns
*Attorney, Agent, or Firm*—Fitch, Even, Tabin & Flannery

[57] ABSTRACT

An indexable face-milling insert having eight compound cutting edges of the same hand, each having an included angle of 90° over its entire length which comprises two straight segments at right angles to each other and an intermediate bevel cutting portion.

2 Claims, 11 Drawing Figures

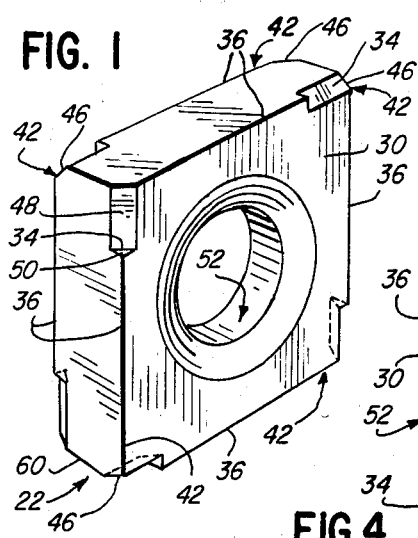
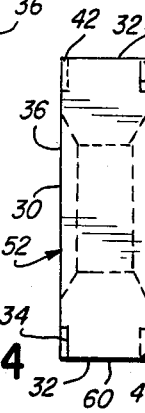
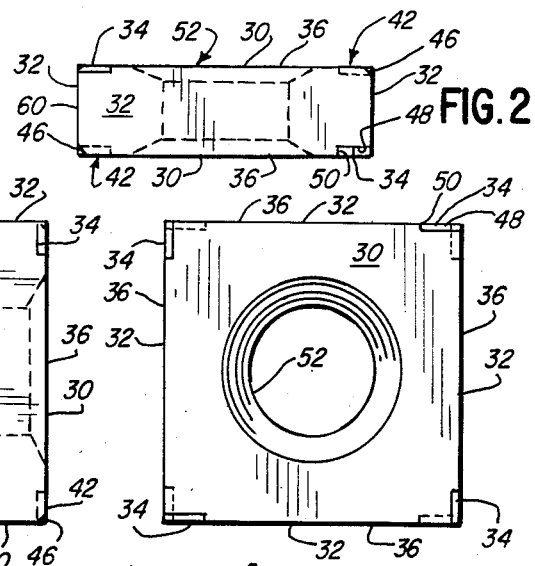
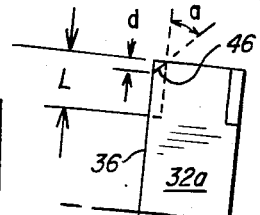
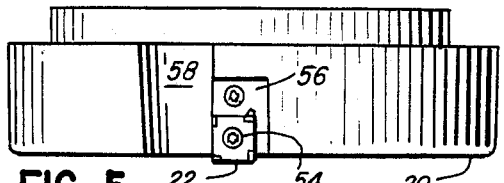
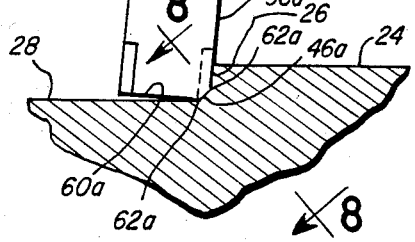
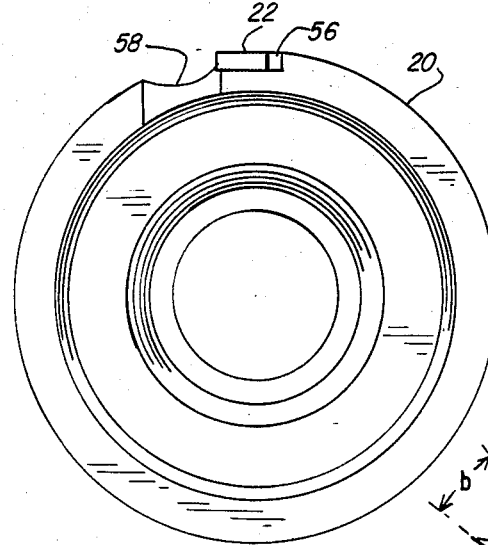
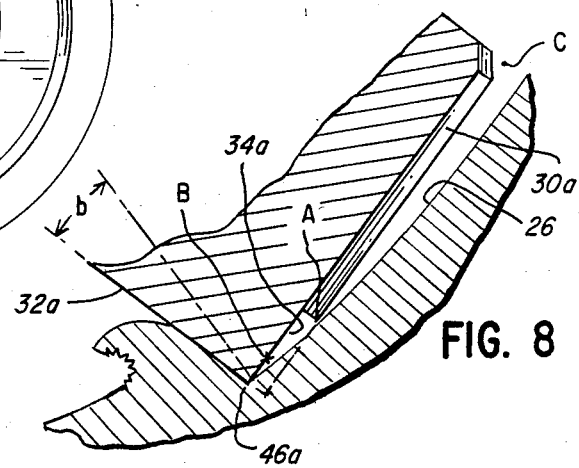

FACE MILLING APPARATUS WITH EIGHT-EDGED INSERT

BACKGROUND OF THE INVENTION

This invention relates to indexable cutting inserts for face milling and more particularly to inserts adapted to face milling applications, such as the milling of cast iron, which are tolerant of negative rake-face geometry.

In such applications, it is possible to employ inserts of the simplest form, viz., a rectangular parallelepiped having two opposed major faces which are square and which may be indexed so as to selectively present each of four narrower surrounding minor faces as rake faces, and to present each of the eight long edges of the two major faces as the major cutting edges of the insert.

An insert of this type is shown by Lacey U.S. Pat. No. 3,818,562 in which the juncture of the two active cutting edges of each rake face is strengthened by a chamfer created by grinding a triangular facet which extends rearwardly from the rake face along a minor portion of that edge of the exposed major face of the insert which trails from the rake face and provides clearance behind the chamfered cutting edge.

It has been discovered, however, that the provision of corner relief by the geometry proposed by Lacey requires very negative radial rake in order to provide the minimum clearances behind the cutting edges required by good practice, particularly in applications for which relatively low lead angles of the face mill are desired. It is well understood in the art that the more negatively radial the rake face must be disposed to obtain the necessary clearance angles for reasonable tool life, the greater is the force required for the milling operation and thus the greater the heat produced in the cutting insert, with consequent shortening of tool life for that reason. Equally important, however, to many cutting applications is that the more negatively radial the rake face is disposed, the greater is the distortion of the workpiece from the cutting forces, and the greater the incidence of "break out", i.e., chipping, at the exiting edge of the resulting surface of the workpiece being milled.

The present invention is based upon the discovery that by a relatively minor change in the method of producing the strengthening chamfer at the corner of the two cutting edges of the rake face, a very substantial increase in tool life can be achieved as a result of the cooperation of two factors made possible by the invention, namely, the achievement of adequate clearances at low lead angles with much lower angles of negative radial rake, thus reducing the cutting forces required, and the increase of the clearance angle behind the chamfered portion at the corner of the two cutting edges, thereby increasing the life of that vulnerable portion of the cutting edge.

The result has been to substantially increase the life of the insert in each of its eight positions, and to significantly reduce the cost of tooling for face milling operations of the kind described, particularly for heavy rough-cutting operations, with resulting reduction of downtime for tool replacement and in the overall operating costs attendant thereto.

SUMMARY OF THE INVENTION

A general object of the present invention is to provide an improved face milling insert which is comparable in cost to known face milling inserts, but which offers longer useful life.

Another object of the invention is to provide an indexable face milling insert which provides eight usable cutting edges of the same hand.

A further object of the invention is to provide an indexable face milling insert wherein each cutting edge has its primary clearance faces perpendicular to its rake face.

Additional objects and features of the invention are set forth in the following description.

BRIEF DESCRIPTION OF THE DRAWINGS

FIG. 1 is an isometric view of an insert in accordance with the invention.

FIG. 2 is a plan view of the insert of FIG. 1.

FIG. 3 is a side elevational view of the insert of FIG. 1.

FIG. 4 is a front elevational view of the insert of FIG. 1.

FIG. 5 is a diagrammatical elevational view of a cutter body having the insert of FIG. 1 mounted thereon.

FIG. 6 is a bottom view of the cutter body and insert of FIG. 5.

FIG. 7 is a diagrammatical view showing the insert of FIG. 1 in operation.

FIG. 8 is a sectional view taken substantially along line 8—8 in FIG. 7 and looking in the direction of the arrows.

DETAILED DESCRIPTION OF THE PREFERRED EMBODIMENT

Figure 9:
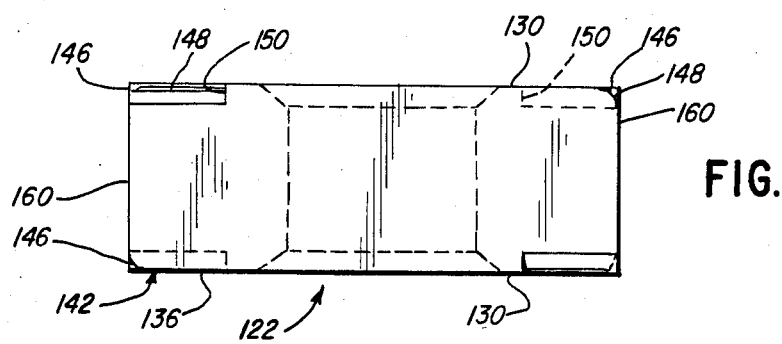
FIG. 9 is a plan view of an insert in accordance with the second embodiment of the invention.
Figure 10:
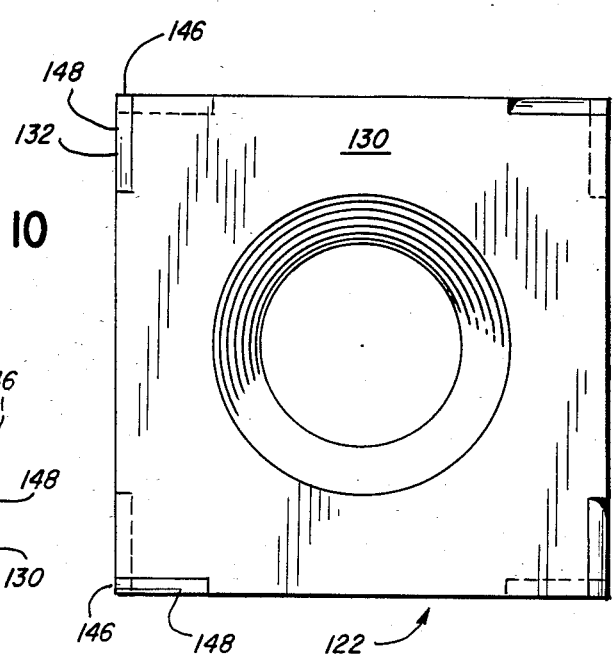
FIG. 10 is a side elevational view of the insert of FIG. 9.
Figure 11:
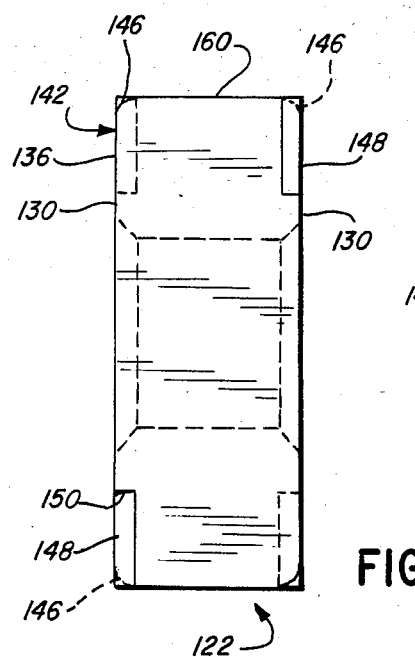
FIG. 11 is a front elevational view of the insert of FIG. 9.

The invention is embodied in an indexable insert and in a face milling cutter employing the insert. A first embodiment of the invention is illustrated in FIGS. 1-8. A second embodiment is illustrated in FIGS. 9-11.

FIGS. 5 and 6 illustrate diagramatically a cutter body 20 having a single insert 22 mounted thereon. In actual use, a cutter body would have a plurality of inserts mounted thereon. As a general rule it is desirable that at least one insert be in contact with the workpiece at all times during milling to limit the fluctuation of loading on the cutter and workpiece.

For purposes of description herein, the cutter body 20 and associated inserts 22 will be described in an orientation wherein the cutter body 20 rotates about a vertical axis. It will be understood that during operation, the axis of the cutter body might be otherwise oriented. However, regardless of the orientation of the axis, the finished surface produced by the face milling operation is generally perpendicular to the cutter axis, and for the following description will be assumed to be horizontal.

Face milling involves removing a layer of material from a workpiece to provide a plane surface. During milling, the cutter body 20 is advanced horizontally so that the inserts successively engage the top of the workpiece at the desired depth. During such milling, the work may be described as having three separate surfaces, illustrated in FIG. 7: a generally horizontal, generally planar uncut surface 24; an inclined cut surface 26; and a cut surface 28 which is in a plane perpendicular to the cutter axis, i.e., horizontal as illustrated, and parallel to the uncut surface 24.

As illustrated in FIG. 5, the insert 22 has a transverse countersunk bore 52 through its center to accommodate a machine screw 54 which fastens the insert 22 to the cutter body 20. Each insert 22 is seated in an L-shaped nest 56. A chip gullet 58 is formed in the cutter body immediately forward of each insert. The illustrated cutter body 20 and insert 22 are set up for righthanded cutting. In righthanded cutting, the cutter body 20 rotates clockwise as viewed from the spindle. Accordingly, the cutter body 20 rotates counterclockwise as viewed from the bottom as in FIG. 6.

The inserts 22 used with the illustrated cutter body are of the "on-edge" type, i.e., wherein the smallest dimension of the insert is oriented generally radially, roughly perpendicular to the direction of motion. Cutting forces are directed through the insert along a major dimension thereof to substantially eliminate bending, i.e., tensile loading of the insert 22.

As best seen in FIGS. 1-5, the illustrated insert 22 has a pair of generally square side faces 30 which function alternately as locating and clearance faces, and four generally rectangular, generally planar end faces 32. The major dimension of the insert 22 is the length of a side of one of the square side faces 30. The length of each of the four generally rectangular end faces 32 is the major dimension of the insert, and the width of each of the end faces 32 is the minor dimension or thickness of the insert. During milling (FIG. 5) the insert 22 is oriented with one of the four generally rectangular end faces 32 functioning as the rake face, two of the end faces serving as upper and rear locator faces, and the fourth as a clearance face above the surface 28 of the workpiece.

The insert 22 is generally parallelepiped shaped, modified by chamfering relief surfaces 34 at its eight corners, rather than points. It is generally undesirable for an insert to have a pointed corner defined by the intersection of three perpendicular surfaces as part of a cutting edge, because such a corner is weak and apt to break off during cutting.

A parallelepiped with a pair of square side faces has eight major edges 36 equal in length to the major dimension of the insert. In manufacturing the insert 22, end portions of each of the eight edges of a parallelepiped-shaped block are ground away to define the relief surfaces 34. As set forth below, each of the remaining portions 36 of the eight major edges functions as part of a cutting edge 42.

One presently commercial prior art insert, the "Max-I-Cut double negative indexable", offered by Ingersoll Cutting Tool Company, is somewhat similar to that of the invention in that it is formed by chamfering a parallelepiped-shaped insert along the entire lengths of four of its eight major edges to define relief surfaces behind the chamfered corners of only two of the minor faces which thereby become the only rake faces. Each of the rake faces has two long edges, each of which has a first portion usable only in a righthanded context and a second portion usable only in a lefthanded context. However, the use of both the righthanded and lefthanded cutting edges requires setup of both a lefthanded and a righthanded cutter using the same insert which is not practical in most operations, thus limiting such inserts to four major cutting edges in actual practice.

In accordance with the present invention, there is provided an insert 22 having eight substantially identical compound cutting edges 42, all of the same hand, on a generally parallelepiped-shaped block, wherein each cutting edge 42 includes a long first segment 36 at the intersection of a generally rectangular end face 32 with a generally square side face 30, an oblique second segment 46 at the intersection of the generally rectangular end face 32 with a relief surface 34, and a short third segment 60 at the intersection of the end face 32 with another end face 32. The oblique second segment 46 intersects both of the other segments to cut a bevel between the cuts made by the other two segments.

Each segment of each cutting edge preferably has an included angle of 90°. That is, each segment of each cutting edge is defined by the intersection of two perpendicular surfaces. The length of each relief surface 34 is a minor fraction of the major dimension of the insert.

Each relief surface 34 includes a substantially rectangular planar portion 48 behind the oblique segment 46 of the cutting edge 42, and a transitional surface 50 which merges with the adjacent trailing cutting edge segment 36 at point A. In the illustrated embodiment, the transitional portion 50 is planar and substantially perpendicular to the rectangular portion 48. In other embodiments, both portions of the relief faces 34 may have different or nonplanar configurations.

In FIGS. 7 and 8, the active cutting edge is denoted 42a; its first, second and third segments are labeled 36a, 46a and 60a respectively; the end face which functions as the rake face is labeled 32a; the generally square side face which intersects the rake face 32a to define the first segment 36a is labeled 30a; and the relief surface intersecting the rake face 32a to define the second segment 46a is labeled 34a.

It should be noted that an identical compound cutting edge is similarly formed at the diagonally opposite corner of the rake face 32a, ready to be placed in service by removing the holding screw and rotating the rake face 32 end for end.

The action of a cutting edge 42 on a workpiece may be described in detail with reference to FIGS. 7 and 8. Because FIG. 8 is taken in a plane perpendicular to the oblique segment 46a, the oblique segment 46a appears as a point in FIG. 8. As illustrated in FIG. 8, the angle between the rake face 32a and the relief surface 34a at the second or oblique segment 46a of the cutting edge, i.e., the included angle of the cutting edge, is preferably about 90° in order to allow satisfactory primary clearance to be maintained behind the oblique second segment 46a of the cutting edge without requiring extremely negative effective rake for that segment. In the preferred embodiment of the invention, this angle is 90° for all segments of the cutting edge 42a.

In one proposed and evolutionary form of insert, identical to the insert 22 of FIGS. 1-8 except that it had a single planar, generally triangular relief surface of the type shown in Lacey U.S. Pat. No. 3,818,562 at each corner, the included angle at the second or oblique segment of the cutting edge was accordingly greater than 90°. However, the triangular form of relief surface shown by Lacey has been found to have significant drawbacks in the rate of formation of wear lands.

A cutting edge ideally makes linear contact with the workpiece. However, in time, the cutting edge wears by developing a wear land which slides along the inclined cut surface 26 behind the cutting edge 42. Absent breakage, the useful life of an insert is limited by the rate at which wear lands of its cutting edges grow. As the area of the wear land increases, frictional forces increase. The frictional forces between the wear land and the workpiece generate heat. Once the wear land reaches a certain limit, the insert is no longer usable. The maximum extent of the wear land may be determined by the maximum torque available to drive the cutter or may be determined by the amount of heat or cutting force which the insert and/or the workpiece can withstand without distortion or damage.

As a general rule, decreasing the primary clearance increases the rate of wear land growth. Accordingly, for a given effective rake, increasing the included angle of the cutting edge increases the rate of wear land growth by decreasing the primary clearance. The insert of the present invention enables a lower rate of wear land growth to be maintained along the oblique bevel-cutting segment 46a of the cutting edge as compared with an insert having the triangular relief surfaces prescribed by Lacey U.S. Pat. No. 3,818,562. Primary clearance along this segment 46a can be increased in this simple form of insert only by increasing the negativity of the effective rake for the segment, which would increase the cutting forces along the segment 46a and would therefore be self-defeating. The relationship between the effective rake and the primary clearance for the bevel-cutting segment 46a may be appreciated by reference to FIG. 8, where the effective rake angle for this segment 46a is designated "b".

Provision of adequate primary clearance behind a cutting edge is part of the more general problem of providing adequate clearances at all significant points of which there are three in the present instance.

First, it is desirable that a clearance of at least about 0.012 in. be maintained between the point "A" (FIG. 8) and the inclined cut surface 26 behind the cutting edge 42. Such clearance is desirable to preclude contact between the insert at point "A" and the work surface under normal conditions of vibration, springback and tool wear. This clearance will be referred to hereinafter as "clearance A".

It is also desirable that a minimum clearance of at least about 0.008 in. be maintained at a distance of 0.060 in. (at approximately 1/16 inch) behind the cutting edge to control the rate of wear land formation within acceptable limits. This clearance will hereinafter be referred to as "clearance B", so labeled in FIG. 8. However, the distance between point B and surface 26 in the plane of FIG. 8 may not be clearance B, because the minimum clearance may be in a different plane.

It is further desirable that a clearance of at least about 0.045 in. be maintained between point C (FIG. 8) and the workpiece. Point C is the point at which the heel or trailing corner of the insert would be without the corners of the insert being relieved. This clearance is hereinafter referred to as "clearance C".

By way of example, the advantages of the insert 22 in providing the desired clearances are apparent when the insert is used at a lead angle of between 2° and 30°, and a radial rake of about −10°. A minimum lead angle of approximately two degrees is desirable in an insert of one-quarter inch thickness to lift at least one-half of the short cutting edge 60a from the cut surface 28 (FIG. 7) to preserve it intact for later use as the insert is indexed. A larger lead angle may be desirable if the diameter of the cutter is small.

Clearances have been calculated for an insert 22 oriented at a lead angle of 5°, an axial rake of −6°; and having a major dimension of 0.5 in., a minor dimension of 0.25 in., a chamfer length, illustrated by the letter "l" in FIG. 7, of 0.188 in., and a chamfer size of 0.030 in. by 45°. The dimension 0.030 in. corresponds to the dimension indicated by "d" in FIG. 7 and the angle of 45° as indicated by the letter "a" in FIG. 7. All angles and the diameter are measured at the "sharp corner" of the cutting edge in use, which is the point (not actually on the insert) defined by the intersection of the first segment 36a of the cutting edge and the bottom edge 60a of the rake face 32a.

| Calculations for Insert of FIGS. 1-8 | | | | |
|---|---|---|---|---|
| Dia. | Radial Rake | Clearance A (In.) | Clearance B (In.) | Clearance C (In.) |
| 6.0 | −10° | .0114 | .0112 | .0484 |
| 12.0 | −10° | .0132 | .0113 | .0617 |
| 16.0 | −10° | .0137 | .0113 | .0649 |

For purposes of comparison, the same calculations were made for the proposed insert described above having planar, triangular relief surfaces as in the Lacey patent which define an included angle of greater than 90° for the oblique segment of the cutting edge, yielding the following results:

| Calculations for Insert with Planar, Triangular Relief Faces | | | | |
|---|---|---|---|---|
| Dia. | Radial Rake | Clearance A (In) | Clearance B (In.) | Clearance C (In.) |
| 6.0 | −10° | .0114 | .0045 | .0484 |
| 12.0 | −10° | .0132 | .0046 | .0617 |
| 16.0 | −10° | .0137 | .0047 | .0649 |
| 6.0 | −15° | .0221 | .0079 | .0767 |
| 12.0 | −15° | .0239 | .0080 | .0897 |
| 16.0 | −15° | .0244 | .0081 | .0930 |

Thus, for radial rake of −10°, the clearance B provided by a triangular relief face is insufficient because it fails to provide a clearance of at least 0.008 in. at "B". Increasing the radial rake to −15° yields acceptable values for clearance B for cutters of 12 in. or 16 in. diameter and almost acceptable values for clearance B for cutters of 6 in. diameter. However, increasing radial rake to −15° would produce unacceptably high cutting forces in some applications due to the resultant increase in negativity of the effective rake. Accordingly, the insert of the present invention provides a significant advantage in that it provide the necessary clearances with less effective rake and thus with lower cutting forces. Moreover, the included angle of 90° at the oblique cutting edge 62a provides a greater primary clearance angle behind that edge than is available with triangular relief surfaces, making for longer life of that edge.

The insert of the invention may be produced from a parallelepiped-shaped carbide block with a countersunk transverse bore, by grinding the corners to form the relief surface 34, and, if desired, applying a coating to increase the hardness and wear-resistance of the surfaces. Grinding of the relief surfaces 34 on the above-described insert may be accomplished relatively simply. For each corner, a plurality of inserts may be lined up in parallel and advanced through a grinding wheel while inclined at an angle of 45° to their direction of travel so that the resulting relief surfaces on the respective inserts are coplanar.

Referring to FIGS. 9–11, there is shown an insert 122 in accordance with the second embodiment of the invention. The insert 122 includes an arcuate bevel segment 146 in each of its cutting edges and an outwardly curved portion 148 in each of its relief surfaces. Otherwise, it is identical to the insert of FIGS. 1–8, and accordingly, each element is denoted by the reference character used for the corresponding identical element in FIGS. 1–8 preceded by the numeral "1". Thus, the arcuate bevel segment 146 of the cutting edge 142 of the insert of FIGS. 9–11 corresponds to the linear bevel segment 46 of the cutting edge 42 of the insert of FIGS. 1–8.

The outwardly curved portion 148 of each relief surface 134 preferably blends smoothly with an adjacent end face 132 and the adjacent side face 130. An advantage of this configuration over the configuration of the embodiment of FIGS. 1–8 for some operations is that the two points of intersection 62a of the three segments of the cutting edge 42a of FIGS. 1–8 are eliminated. Elimination of the points 62a results in a smoother finished surface 28 on the workpiece where that is desired, and where provision of a separate wiping insert is not, and also strengthens the insert by eliminating areas of stress concentration which might be susceptible to breakage or chipping where the insert is of an exceptionally brittle material. It will be readily apparent however, that the curved surface 148 of the insert of FIGS. 9–11 is more difficult to grind than the planar surface 48 of the embodiment of FIGS. 1–8.

From the foregoing it will be appreciated that the present invention provides novel and improved apparatus for face milling. While preferred embodiments of the invention have been illustrated and described herein, there is no intent to limit the invention to these or any particular embodiments. The scope of the invention is defined by the following claims.

What is claimed is:

1. An indexable, eight-position, on-edge, face-milling insert in the shape of a rectangular parallelepiped having:

a pair of parallel, generally square side surfaces; and
   four generally rectangular end surfaces extending, between and perpendicular to said side surfaces, each having its minor edges perpendicular to said side surfaces;
   said end surfaces each serving as a rake face of the insert in two of the indexable positions of the insert and as locator surfaces and as the axially-facing clearance surface, respectively, in others while said side surfaces serve respectively as the radially-inward-facing seating surface of the insert and the radially-outward-facing clearance surface thereof;
   each end surface having a pair of diagonally-opposite compound cutting edges, one for each of said two indexable positions, each of said compound cutting edges comprising a substantial portion of that major edge of said end surface formed by its intersection with said radially-outward-facing clearance surface of the insert, a minor portion of the adjacent minor edge of said end surface formed by its intersection with said axially-facing clearance surface, and an intermediate bevel-cutting portion at the junction of said major and minor edges;
   each intermediate bevel-cutting portion of each cutting edge resulting from a plane relief surface which recedes substantially perpendicularly from said end surface for at least a minor fraction of the length of the common major edge formed by said axially-facing and radially-outward-facing clearance surfaces of the insert,
   said insert having a central hole extending between its side surfaces to receive a securing fastener.

2. The combination of a face milling cutter body having multiple insert pockets therein each containing an indexable, eight-position, on-edge, face-milling insert in the shape of a rectangular parallelepiped having:

a pair of parallel, generally square side surfaces; and
   four generally rectangular end surfaces extending between and perpendicular to said side surfaces, each having its minor edges perpendicular to said side surfaces;
   said end surfaces each serving as a rake face of the insert in two of the indexable positions of the insert and as locator surfaces and as the axially-facing clearance surface, respectively, in others while said side surfaces serve respectively as the radially-inward-facing seating surface of the insert and the radially-outward-facing clearance surface thereof;
   each end surface having a pair of diagonally-opposite compound cutting edges, one for each of said two indexable positions, each of said compound cutting edges comprising a substantial portion of that major edge of said end surface formed by its intersection with said radially-outward-facing clearance surface of the insert, a minor portion of the adjacent minor edge of said end surface formed by its intersection with said axially-facing clearance surface, and an intermediate bevel-cutting portion at the junction of said major and minor edges;
   each intermediate bevel-cutting portion of each cutting edge resulting from a plane relief surface which recedes substantially perpendicularly from said end surface for at least a minor fraction of the length of the common major edge formed by said axially-facing and radially-outward-facing clearance surfaces of the insert,
   said insert having a central hole extending between its side surfaces to receive a securing fastener,
   each pocket providing a radially-outward-facing seating surface to receive one of the side surfaces of the associated insert and two locator surfaces mutually perpendicular to said radially-outward-facing seating surface and to each other to receive two of said end surfaces of the insert then serving as the locator surfaces of the insert,
   said seating and locator surfaces of the insert pocket having an orientation such as to support the associated insert at a lead angle of about 5 degrees and a radial rake angle of $-10$ degrees, and
   means removably securing each insert in its respective pocket in abutting engagement with the seating and locator surfaces thereof.

* * * * *

UNITED STATES PATENT AND TRADEMARK OFFICE
CERTIFICATE OF CORRECTION

PATENT NO.  : 4,597,695
DATED       : July 1, 1986
INVENTOR(S) : William B. Johnson It is certified that error appears in the above-identified patent and that said Letters Patent is hereby corrected as shown below:

IN THE CLAIMS

Column 7, line 43, at the end of the line, delete the comma after the word "extending"; and Column 8, line 4, change "fing" to --ting-- in the hyphenated word "cutting".

Signed and Sealed this

Seventh Day of October, 1986

[SEAL]

Attest:

DONALD J. QUIGG

Attesting Officer

Commissioner of Patents and Trademarks